Sept. 3, 1929.    V. BRIDGMAN    1,726,944
ADVERTISING SIGN
Filed May 9, 1927
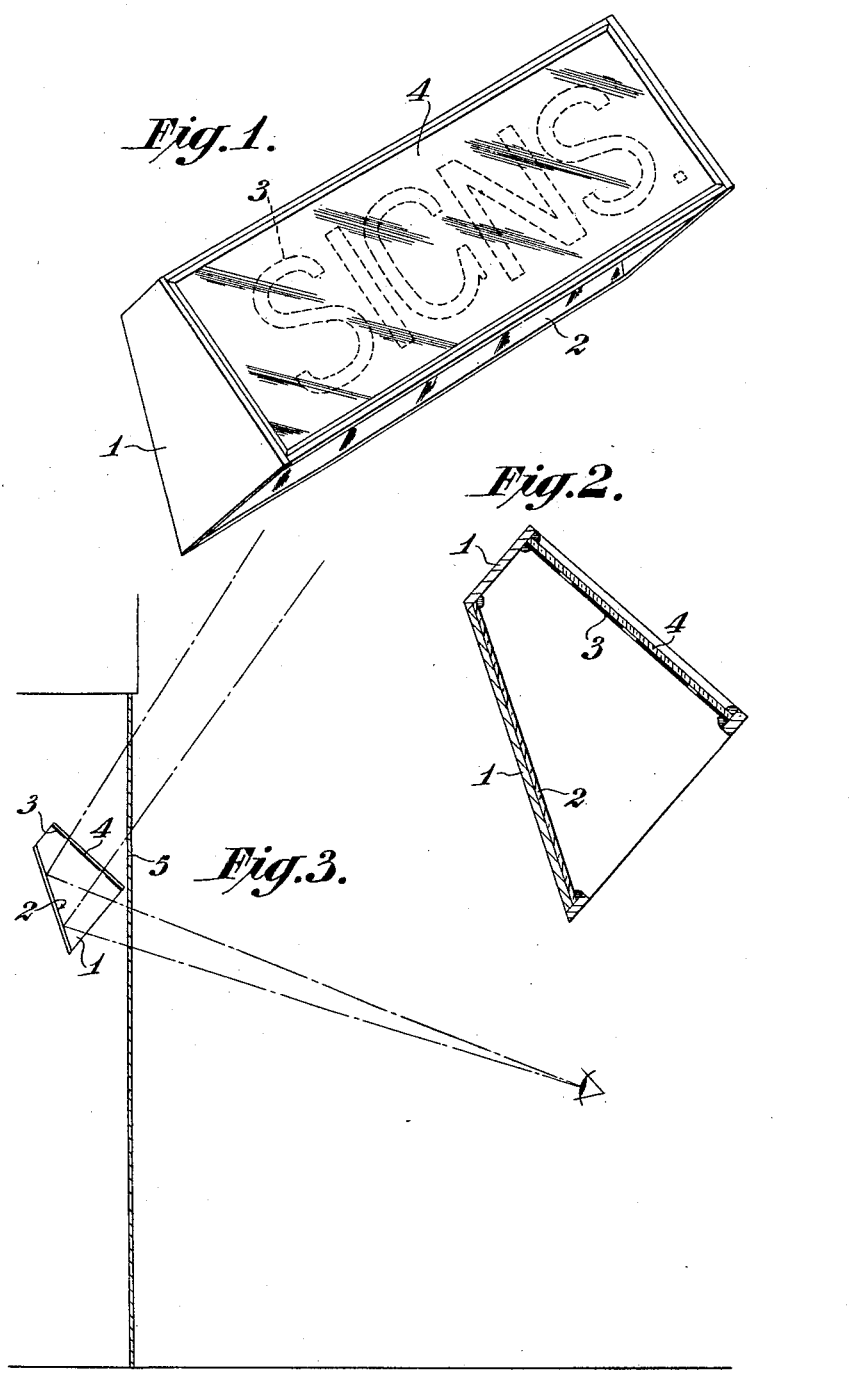
INVENTOR
VICTOR BRIDGMAN.
By Patented Sept. 3, 1929.

1,726,944

UNITED STATES PATENT OFFICE.

VICTOR BRIDGMAN, OF BAYSWATER, LONDON, ENGLAND, ASSIGNOR TO SOLAFLEX LIMITED, OF LONDON, ENGLAND, A CORPORATION OF GREAT BRITAIN.

ADVERTISING SIGN.

Application filed May 9, 1927, Serial No. 190,019, and in Great Britain November 15, 1926.

This invention relates to signs and the like which are intended particularly for exhibition in shop windows and similar situations for advertising or other purposes.

The type of sign to which the invention relates is that in which light passing through a stencil, transparency or the like, hereinafter termed stencil, is reflected by means of a reflecting surface or mirror to the eyes of the observer, the stencil being interposed between the mirror and the source of light and not between the mirror or reflector and the observer.

I am aware that various devices of this type have hitherto been proposed which are so arranged that the mirror reflects light passing through the stencil from a suitable source, either natural or artificial, which is either substantially vertically above the mirror or is above and behind the mirror relatively to the observer, that is to say, the light is reflected from a source which is behind a vertical plane which is parallel to and slightly in front of the front edge of the mirror. Such devices, if not artificially illuminated, are not adapted to be exhibited in such places as for example, shop windows, for being viewed by an observer in the street outside, because, as hereinbefore stated, they reflect light from a source which is either directly above or above and behind the mirror, and in such a situation, therefore, they will only reflect light from the walls or ceiling of the shop to an observer outside, and, as the brightness of these is not usually very great compared with the light outside, the reflected image will not appear to be very brightly illuminated. I make no claim, therefore, to devices of this nature arranged in the manner aforesaid.

Now the object of the present invention is to provide an improved sign of the aforesaid type which, without being artificially illuminated, is adapted to be exhibited in shop windows and similar situations for being viewed by an observer in the street outside.

To this end, according to the invention the reflecting surfaces and stencil are arranged relatively the one to the other and the device is arranged in position in the shop window or similar situation in such a manner that light from a source above and in front of the mirror, that is to say, from a source above the mirror and in front of a vertical plane passing through the front edge of the mirror, passes through the stencil and is reflected back in front of the mirror. The stencil, which may be either substantially parallel to the reflector or inclined at an angle thereto, in order that it may not obstruct the view of the reflected image is preferably arranged at some distance from the reflector, the distance between the two being determined by the angle of view desired. Obviously, the adjustment of the device i. e. the angle of inclination of the mirror when the device is placed in position, will vary slightly depending upon the height of the device relatively to the observer, the distance away of the observer and the direction of the incident light. Moreover, according to my invention, the arrangement of reflecting surface and stencil is such that the reflected image, in addition to appearing to be brilliantly illuminated, when viewed from the angle at which it is intended to be observed is seen without the view being obstructed by the stencil and is free from the appearance of tilting and is unaccompanied by the view of any sky or other external object, thereby creating the illusion above mentioned.

My invention described in terms of angular adjustment may be stated with more precision as follows:—

The angle, which the mirror makes with the horizontal, will, as above mentioned vary with the angle at which the sign is intended to be viewed. But assuming that the sign will normally be somewhat above the eye of the observer and the angle small which the intended line of vision makes with the horizontal then the angle which the mirror makes with the horizontal (to the rearward of the bottom edge of the mirror) will in apparatus constructed according to my invention be slightly greater than 45°; this angle increasing in proportion to the increase of the angle of intended vision. The angle at which the stencil is set to the mirror to obtain an optimum effect according to the invention will be substantially equivalent to 90° less the angle which the mirror makes with the horizontal as aforesaid. By an angular adjustment as above indicated the observer, when viewing the sign from the intended point of view will see the reflected image in an upright position and brilliantly illuminated, without being accompanied by a view of the sky or other external objects. A small deviation from the above-mentioned angles is within the purview of my invention provided that the effects above mentioned are all substantially obtained.

According to a preferred embodiment of the invention, the device comprises a box or frame-work open at one side and having a mirror fitted therein and a stencil arranged above the mirror in such a manner that it is either substantially parallel to the mirror or somewhat inclined thereto preferably so that the inner or back edges of the stencil and mirror are nearer together than their front edges. The stencil and mirror are arranged at some distance from one another so that even in the case when they are inclined to one another their inner edges are spaced apart. The apparatus is fitted up, being suspended for example by means of chains or cords in a shop window, in such a manner that light from the sky above the street outside passes through the stencil and is reflected back into the eyes of an observer outside the shop.

The whole of the interior of the device, with the exception of the mirror and the apertures in the stencil, is preferably blackened, so that when viewed from outside the reflected image appears to be brightly illuminated.

Means may be provided whereby the angle of the mirror may be adjusted in order to suit various conditions regarding the normal position of the observer and the direction of the source of light. Suitable means comprise slots or stops or the like in or against which the mirror or stencil can be fitted, or the angle may be adjusted by means of the chains, cords or the like by which the device is suspended, or by other means whereby the device is fixed in position.

In order to diffuse the light and prevent a reflection of the source of light appearing in the reflector, the stencil is preferably covered with fluted, corrugated or prismatic glass or the like and the fluted glass or the like may be placed a small distance in front of the stencil in order to enhance the effect. In order to obtain a coloured image, transparent or translucent coloured material, such as glass or celluloid, may be fitted over the stencil or mirror or both or the fluted glass or the like may be painted and by using strips of different colours or intensities different colour effects may be obtained.

The stencil is preferably removable so that the reflected designs or inscriptions can easily be varied, and for this purpose also, in the case of inscriptions, the stencil letters may be separate from each other.

The whole of the interior surface of the device other than the mirror and lettering or designs is, as previously stated, preferably blackened so that the design or inscription appears bright on a black back ground, if desired, however, the lettering may be opaque on a transparent or translucent ground.

Although the sign is particularly adapted for being viewed by daylight it may of course also be artificially illuminated. In this case the illuminating means should be placed in such a position that they do not intercept the natural light when the sign is used in the day time, and for this purpose the stencil may be suitably illuminated by means of strip lights placed along one or both edges of the stencil so that they are invisible to the observer. In some cases, instead of being specially illuminated, the sign may be placed to reflect an extraneous existing source of illumination. By using different coloured lights various colour effects may again be obtained.

The stencil may be cut out of flexible material and caused to move by any suitable mechanism, being passed for example round rollers.

A preferred embodiment of the invention is illustrated by way of example in the accompanying drawing, in which, Fig. 1 is a perspective view of the device,
Fig. 2 a cross-section and
Fig. 3 a diagrammatic view showing the sign fitted in a shop window.

Referring to the drawing, the sign comprises a box or framework 1, having a mirror 2 fixed therein and a stencil 3 covered by a sheet of fluted glass or the like 4 fitted above the mirror.

On reference to Fig. 3 which represents the device suspended, by means not indicated in the drawing, in a shop window of which 5 represents the glass front, it will be seen that light from the sky outside passing through the stencil will be reflected to an observer outside the window so that a brightly illuminated image of the stencil will appear in the mirror.

In some cases, for instance if the sign were intended to be viewed from inside the shop, a second mirror might be arranged so that a second reflection takes place in a reversed direction. In this case, of course, the stencil lettering as viewed from outside the device would have to be reversed.

Although the device is particularly intended for exhibition in shop windows and similar situations, it may also be employed in a similar manner in other suitable situations, for example, beside a railway line for being viewed by passengers in trains, or outside a building.

I claim:—

1. A device of the class described comprising in combination with a glass show window, a box-like body adapted to be arranged behind said show window and comprising a top wall carrying a stencil and a bottom wall carrying a reflector, said top wall and bottom wall being arranged in divergent relation with reference to one side of the box which is open whereby a portion of the reflector is partly masked by the top wall carrying the stencil, and said box-like body being arranged above the line of vision of an observer.

2. A sign of the class described comprising a housing having top, bottom and a connecting side wall and the side opposite said side wall being open, and said bottom wall being disposed at an oblique angle with reference to the top wall, a stencil carried by the top wall, a reflector carried by the bottom wall, and said housing being adapted to be supported behind a show window so that the top wall thereof is inclined toward the sky outside of such show window, whereby daylight will pass through the stencil to the reflector.

3. The combination with a show window, of a sign including a reflector and a superposed stencil arranged behind the show window and diverging toward the same, said stencil arranged to partly mask the reflector in a horizontal direction whereby the image cast on the mirror by natural light will appear brilliant to the observer.

4. The combination with a show window, of a sign including a reflector and a superposed stencil arranged in divergent relation to the show window and the stencil being inclined rearwardly from the show window to face the sky whereby natural light will pass through the stencil onto the reflector.

5. A sign comprising an opaque member having portions exposed for the passage of daylight therethrough, said member being disposed in a plane perpendicular to a line extending from the sign to a point above and in front of the sign, and a mirror positioned below said member to receive light rays passing through the transparent portions of said member, and to reflect said rays laterally, said mirror being disposed at an acute angle to said opaque member and at an obtuse angle to a horizontal plane.

6. A sign comprising a plane mirror having a reflecting surface disposed at an obtuse angle to a horizontal plane, and an opaque member disposed above said mirror and having portions for the passage of daylight therethrough onto said mirror, said member being disposed at an acute angle to said mirror and in a plane perpendicular to a line extending from the sign to a point above and in front of the sign, the lower edge of said opaque member terminating above the angle of reflection of the highest ray of reflected light from said mirror where said ray passes the lower edge of said member.

VICTOR BRIDGMAN.